(12) United States Patent
Freudiger et al.

(10) Patent No.: US 9,842,215 B2
(45) Date of Patent: Dec. 12, 2017

(54) COMPUTER-IMPLEMENTED SYSTEM AND METHOD FOR ANONYMIZING ENCRYPTED DATA

(71) Applicant: Palo Alto Research Center Incorporated, Palo Alto, CA (US)

(72) Inventors: Julien Freudiger, Mountain View, CA (US); Alejandro E. Brito, Mountain View, CA (US); Shantanu Rane, Menlo Park, CA (US); Ersin Uzun, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/931,774

(22) Filed: Nov. 3, 2015

(65) Prior Publication Data
US 2017/0124335 A1    May 4, 2017

(51) Int. Cl.
G06F 21/00    (2013.01)
G06F 21/60    (2013.01)
G06F 21/62    (2013.01)

(52) U.S. Cl.
CPC ........ *G06F 21/602* (2013.01); *G06F 21/6254* (2013.01)

(58) Field of Classification Search
CPC ........ G06F 21/60; G06F 21/64; G06F 21/602; G06F 21/606; G06F 21/6245; G06F 21/6254; H04L 63/0428
USPC ........................ 713/189, 193; 726/14; 705/54
See application file for complete search history.

(56) References Cited

U.S. PATENT DOCUMENTS

| | | | | |
|---|---|---|---|---|
| 7,181,017 | B1* | 2/2007 | Nagel | H04L 9/0825 380/282 |
| 7,900,052 | B2* | 3/2011 | Jonas | G06F 17/30477 713/153 |
| 8,204,213 | B2* | 6/2012 | Hunt | G06F 17/30979 380/28 |
| 8,762,741 | B2* | 6/2014 | Chase | G06F 21/6254 713/189 |
| 8,862,880 | B2* | 10/2014 | Combet | H04L 63/0421 380/277 |
| 9,166,953 | B2* | 10/2015 | Luukkala | G06F 21/602 |

(Continued)

OTHER PUBLICATIONS

JL. Bentley. Multidimensional binary search trees used for associative searching. Communications of the ACM, 1975.

(Continued)

*Primary Examiner* — Hosuk Song
(74) *Attorney, Agent, or Firm* — Patrick J. S. Inouye; Krista A. Wittman

(57) ABSTRACT

A computer-implemented system and method for anonymizing encrypted data is provided. At least one attribute is identified within a dataset for anonymization and is associated with a plurality of data values. Each data value is encrypted for each identified attribute while maintaining an order of the encrypted data values. The encrypted values are ordered and the ordered encrypted data values are segmented into two or more classes based on the ordering of the encrypted data values. A range of the encrypted data values within each of the segmented classes is identified and the range of one of the classes is assigned to each encrypted data value within that class as anonymized data.

20 Claims, 12 Drawing Sheets

(56) References Cited

U.S. PATENT DOCUMENTS 9,195,848 B2 * 11/2015 Davis .................. G06F 21/6218

OTHER PUBLICATIONS

K. LeFevre et al. Mondrian multidimensional K-anonymity. ICDE, 2006.
C. Dwork. Differential privacy. Automata, languages and programming, 2006.
L. Sweeney. k-anonymity: A model for protecting privacy. International Journal of Uncertainty, Fuzziness and Knowledge-Based Systems, 2002.
P. Ohm. Broken Promises of privacy: Responding to the surprising failure of anonymization. UCLA Law Review, 2010.
A. Boldyreva et al. Order-preserving symmetric encryption. EUROCRYPT, 2009.

* cited by examiner

| First Name | Last Name | Age | Acct. No. | Zip Code | Purchases |
|---|---|---|---|---|---|
| Betty | Wu | 62 | 14578 | 21768 | $1,057.21 |
| John | Ireland | 68 | 16743 | 01764 | $4,109.15 |
| Maurice | Thomas | 27 | 09673 | 94602 | $11,012.17 |
| Russell | Smith | 36 | 37810 | 98125 | $19,429.08 |
| Susan | Yamamoto | 45 | 41137 | 14557 | $7,120.54 |
| Marshawn | Sherman | 43 | 28759 | 98109 | $3,235.07 |
| Joe | Lee | 52 | 84221 | 57214 | $2,250.14 |
| Braylon | Wilson | 22 | 02356 | 78265 | $9,283.16 |

FIG. 5

| Age | Encrypted Values | Order | Segmentation | | Range | Anonymized label |
|---|---|---|---|---|---|---|
| 62 | [8791] | [0857] | [0857] | [0857] | Class I | [6321] - [9921] |
| 68 | [9921] | [1056] | [1056] | [1056] | [0857] - [1056] | [6321] - [9921] |
| 27 | [1056] | [2764] | [2764] | [2764] | Class II | [0857] - [1056] |
| 36 | [2764] | [4798] | [4798] | [4798] | [2764] - [4798] | [2764] - [4798] |
| 45 | [6321] | [6321] | [6321] | [6321] | Class III | [6321] - [9921] |
| 43 | [4798] | [7744] | [7744] | [7744] | [6321] - [9921] | [2764] - [4798] |
| 52 | [7744] | [8791] | [8791] | [8791] | | [6321] - [9921] |
| 22 | [0857] | [9921] | [9921] | [9921] | | [0857] - [1056] | n=2
Classes=3

FIG. 7

| | Attribute 1 Class$_1$ | Attribute 1 Class$_2$ | Attribute 1 Class$_3$ | Attribute 1 Class$_4$ |
|---|---|---|---|---|
| Attribute 2 Class$_1$ | Group 3 | Group 1 | Group 2 | Group 2 |
| Attribute 2 Class$_2$ | Group 3 | Group 1 | Group 2 | Group 2 |
| Attribute 2 Class$_3$ | Group 3 | Group 3 | Group 1 | Group 1 |

| First Name | Last Name | Age | Acct. No. | Zip Code | Purchases |
|---|---|---|---|---|---|
| Betty | Wu | [6321] - [9921] | 14578 | [1281] - [444] | $ 1,057.21 |
| John | Ireland | [6321] - [9921] | 16743 | [012] - [089] | $ 4,109.15 |
| Maurice | Thomas | [0857] - [1056] | 09673 | [012] - [089] | $ 11,012.17 |
| Russell | Smith | [2764] - [4798] | 37810 | [476] - [524] | $ 19,429.08 |
| Susan | Yamamoto | [6321] - [9921] | 41137 | [012] - [089] | $ 7,120.54 |
| Marshawn | Sherman | [2764] - [4798] | 28759 | [476] - [524] | $ 3,235.07 |
| Joe | Lee | [6321] - [9921] | 84221 | [1281] - [444] | $ 2,250.14 |
| Braylon | Wilson | [0875] - [1056] | 02356 | [012] - [089] | $ 9,283.16 |

61 → Purchases
62 → First Name column (braced)
63 → [0875] - [1056]

*FIG. 11*

| First Name | Last Name | Age | Acct. No. | Zip Code | Purchases |
|---|---|---|---|---|---|
| [22568893] | [48589921] | [6321] - [9921] | 14578 | [128] - [444] | $1,057.21 |
| [58965899] | [64785031] | [6321] - [9921] | 16743 | [012] - [089] | $4,109.15 |
| [00589758] | [47023568] | [08571] - [1056] | 09673 | [012] - [089] | $11,012.17 |
| [13214485] | [08856123] | [2764] - [4798] | 37810 | [476] - [524] | $19,429.08 |
| [98865218] | [74002441] | [6321] - [9921] | 41137 | [012] - [089] | $7,120.54 |
| [23569109] | [99982032] | [2764] - [4798] | 28759 | [476] - [524] | $3,235.07 |
| [11458011] | [13120336] | [6321] - [9921] | 84221 | [128] - [444] | $2,250.14 |
| [85623410] | [38556011] | [0875] - [1056] | 02356 | [128] - [444] | $9,283.16 |

COMPUTER-IMPLEMENTED SYSTEM AND METHOD FOR ANONYMIZING ENCRYPTED DATA

FIELD

This application relates in general to protecting sensitive data and, in particular, to a computer-implemented system and method for anonymizing encrypted data.

BACKGROUND

During the normal course of business, companies accumulate large amounts of data. Recently, some companies have begun to monetize this data by sharing their data with third parties, such as advertisers, researchers, or collaborative partners. The third parties pay a certain monetary fee and in exchange, receive relevant data from a data owner. The third party can then use the data to target advertising or conduct research. However, the data requested by the third parties often includes information that is private to one or more individuals from whom the data is collected.

In one example, a hospital maintains patient records that include patient identification, age, residential address, social security number, and medical diagnosis. A third party conducting research on diabetes wants to identify regions of the United States that have the most and the least number of Type II diabetes diagnoses for patients below 40 years of age. Prior to sending the requested data, the data owner must ensure that the data to be provided does not allow an untrusted third party to access an individual's private information or determine an individual's identity.

Data anonymization includes the altering of data to protect sensitive information while maintaining features that allow a requesting third party to use the data. The data altering can include adding noise, reducing precision of the data, or removing parts of the data itself. Generally, data owners do not have enough knowledge regarding anonymization and thus, rely on third parties to anonymize their data prior to providing the data to a third party. One approach includes contacting an anonymization service provider that provides individual personnel to help with the data anonymization. The personnel assigned to the anonymization has access to the data despite being an untrusted third party. Currently, many companies ask the anonymization service to sign confidentiality agreements, such as a Memorandum of Understanding or a Non-Disclosure Agreement to protect the data prior to and after the data is anonymized.

Conventional methods for performing data anonymization exist, but fail to address the issue of anonymization by an untrusted third party. In U.S. Pat. No. 7,269,578, to Sweeney, entries of a table are altered based on user specifications, such as specific fields and records, a recipient profile, and a minimum anonymity level. A value for k is computed and quasi-identifiers, which are k tuples that have the same values assigned across a group of attributes, are identified for release. A sensitivity of each attribute is determined and a replacement strategy is determined for each sensitive attribute, such as equivalence class substitution, including one-way hashing, or generalized replacement. Generalized replacement includes identifying the attribute with the largest number of distinct values and generalizing each value for that attribute by reducing the amount of information provided for that value. For example, dates having a month, day and year can be generalized to month and year, year only, or range of years. However, Sweeney fails to consider that the anonymization may be performed by an untrusted party and thus, provides no protection of the data to be anonymized. Further, Sweeny fails to identify a number of classes into which a data set to be anonymized should be divided and to anonymize each data value based on the class in which that data value belongs.

Further, the paper titled "Mondrian Multidimensional K-Anonymity," by LeFevre et al., describes partitioning a dataset, using single-dimensional or multidimensional partitions, such that each region includes k or more points. In one example, the partitioning can occur using median partitioning. However, the LeFevre paper fails to describe steps for protecting the data prior to anonymization, in the event an untrusted third party anonymizes the data. In addition, LeFevre fails to provide measures of data sensitivity to automatically identify attributes for anonymization and further fails to consider masking.

Therefore, there is a need for an approach to making sensitive data available for third party anonymization without compromising the privacy of individuals from whom the data is collected.

SUMMARY

To allow companies to commercialize their data, an owner of the data must ensure that sensitive information within a data set is protected. To protect the data, each attribute within the data set is analyzed to determine a sensitivity of that attribute. Based on the sensitivity of an attribute, anonymization of the data, such as by generalization or masking, may be used to obfuscate the data. When anonymization is selected, data values for the attribute are encrypted and transmitted to an untrusted data anonymizer. The anonymizer anonymizes the data by segmenting the encrypted data values for the attribute into classes and identifying ranges of the encrypted values within each class. Finally, the range of each class is assigned to each encrypted data value that belongs to that class.

An embodiment provides a computer-implemented system and method for anonymizing encrypted data. At least one attribute is identified within a dataset for anonymization and is associated with a plurality of data values. Each data value is encrypted for each identified attribute while maintaining an order of the encrypted data values. The encrypted values are ordered and the ordered encrypted data values are segmented into two or more classes based on the ordering of the encrypted data values. A range of the encrypted data values within each of the segmented classes is identified and the range of one of the classes is assigned to each encrypted data value within that class as anonymized data.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a block diagram showing, by way of example, a table of data values for anonymization by generalization.

FIG. 7 is a flow diagram showing, by way of example, a process for anonymizing data values for a single attribute via generalization.

FIG. 10 is a block diagram showing, by way of example, segmentation of the data values for a second attribute.

FIG. 11 is a block diagram showing, by way of example, the data set of FIG. 5 with generalized anonymization values for two of the attributes.

FIG. 13 is a block diagram showing by way of example, the data set of FIG. 11 with masked anonymization data values.

DETAILED DESCRIPTION

With the increase in companies interested in monetizing their data, ensuring protection of the data is extremely important. Generally, companies do not have enough knowledge regarding data privacy and retain outside businesses to anonymize the data prior to providing the data to a requesting third party. However, outside anonymization companies are often untrusted and confidentiality agreements, such as Non-Disclosure Agreements, are utilized in an attempt to protect the data prior. To ensure data protection, in lieu of confidentiality agreements, an appropriate level of anonymization is determined and anonymization, if required, can be performed blindly. During blind anonymization, the data is encrypted prior to transmitting the data to a third party anonymization company. The encrypted data is then segmented into classes and encrypted ranges of each class are identified. The ranges are assigned to each encrypted data item within that class as a generalized anonymized value.

Figure 1:
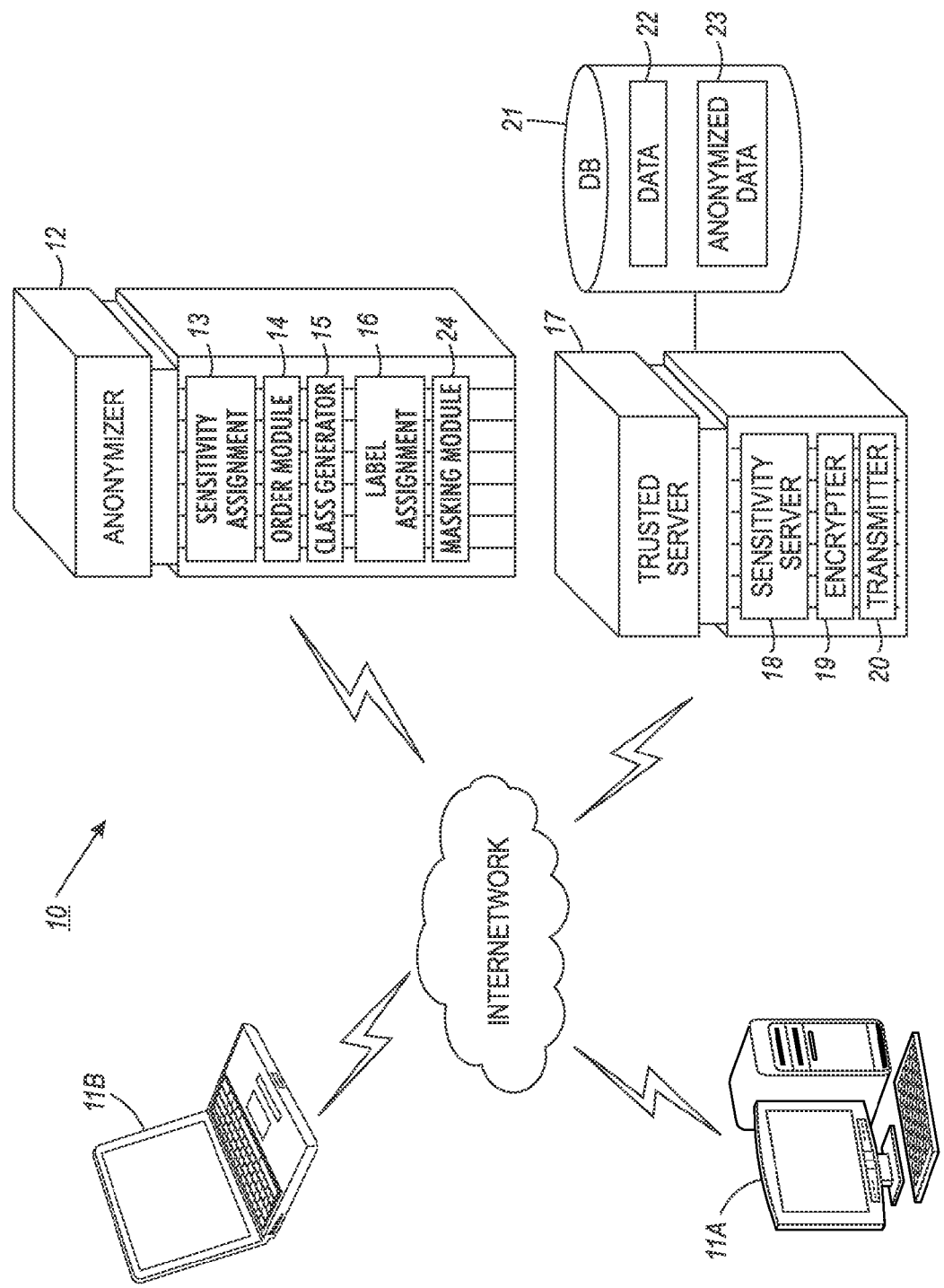
FIG. 1 is a block diagram showing a computer-implemented system for anonymizing encrypted data, in accordance with one embodiment.

Blind anonymization ensures data security and allows companies to provide their data to outside requesters without compromising the privacy of individuals from whom the data is collected. FIG. 1 is a block diagram showing a computer-implemented system for anonymizing encrypted data, in accordance with one embodiment. A data owner maintains large amounts of data 22 collected over time. The data 22 can be stored in a database 21 interconnected to a trusted server 17 located at the data owner's place of business or remotely. Alternatively, the data can be stored in the cloud, including in pools on multiple servers. The data owner can access the data 22 via a desktop 11a or laptop 11b computer, or via other types of computing devices, such as a mobile computing device (not shown). The stored data 22 can include one or more data sets 22 each associated with a plurality of attributes for one or more individuals. Further, each attribute is associated with data values for each of the individuals.

The trusted server 17 includes a sensitivity module 18, an encrypter 19 and a transmitter 20. The sensitivity module 18 identifies those attributes within a requested data set that are potentially sensitive and may require anonymization. Once identified, the encrypter 19 can encrypt each data value for a potentially sensitive attribute. Subsequently, the transmitter 20 transmits all the encrypted data values to an untrusted third party anonymizer 12 for anonymization. The anonymizer 12 includes a sensitivity assignment module 13, an order module 14, a class generator 15, and a label assignment 16. The sensitivity assignment module 13 analyzes each attribute for the encrypted data values received from the trusted server 17 and assigns a sensitivity value to each attribute. The sensitivity value provides a measure of data sensitivity, such as whether the data includes personal information for an individual, such as social security number, credit card number, or address. Other types of personal information are possible. Depending on the sensitivity value assigned to an attribute, anonymization of the data values for that attribute may be necessary to prevent a third party from accessing the personal data. The anonymization can include generalization or masking of the data. Determining an appropriate type of anonymization for an attribute based on the sensitivity value is further described below with reference to FIG. 2.

For generalized anonymization, the order module 14 orders the encrypted data values for an attribute from low to high or high to low. Then, the class generator 15 segments the ordered data into two or more classes, and the label assignment module 16 determines a range of the encrypted data values for each class and assigns the range to each encrypted data value within that class as an anonymized value. The anonymized data is then transmitted to the trusted server 17, and stored in the database 21 or provided to a requesting third party. Alternatively, the data values of an attribute can be anonymized by masking each data value. The masking module 24 replaces sensitive attributes by pseudo-random values, for example using Hashing.

The computing devices and servers can each include a central processing unit, random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. and one or more modules for carrying out the embodiments disclosed herein.

The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. Other types of specialized computers are possible. Further, the management system can be limited to specific clients and specific hardware on which the management system is implemented, as well as limited by a subscription service to only subscribing clients. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
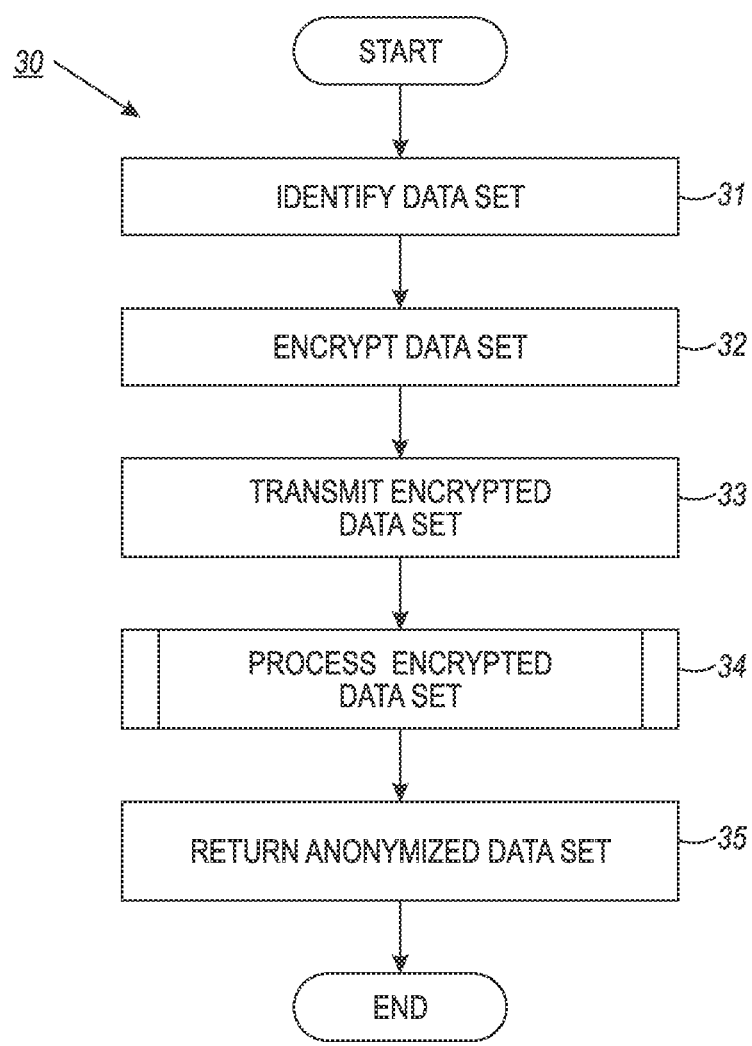
FIG. 2 is a flow diagram showing a computer-implemented method for anonymizing encrypted data, in accordance with one embodiment.

Masking data provides lower privacy protection than generalization, as previous studies have shown to the possibility of de-anonymizing masked databases. Masking should, thus, not be used by itself, and should be combined with generalization. Data generalization offers some protection of the data, while at the same time maintaining the usefulness of the data for third parties to utilize the generalized data for research or advertising. When data generalization is performed, the data values for an attribute are encrypted prior to anonymization to add an additional layer of data protection. FIG. 2 is a flow diagram showing a computer-implemented method for anonymizing encrypted data, in accordance with one embodiment. A data owner receives a request for a particular type of data and a data set with the requested data is identified (block 31). The data set can include a list of individuals and data values for attributes associated with each of the individuals. The data owner analyzes the data set to determine whether one or more of the attributes are determined to potentially include sensitive, or personal, data and if so, how sensitive the data is. Sensitive data includes information that may identify a specific individual, which can result in a loss of security, if disclosed to others. Subsequently, the data values associated with potentially sensitive attributes are encrypted (block 32). In a further embodiment, all the data values in the data set are encrypted for providing to the anonymizer, which can solely determine which attributes are sensitive.

Figure 3:
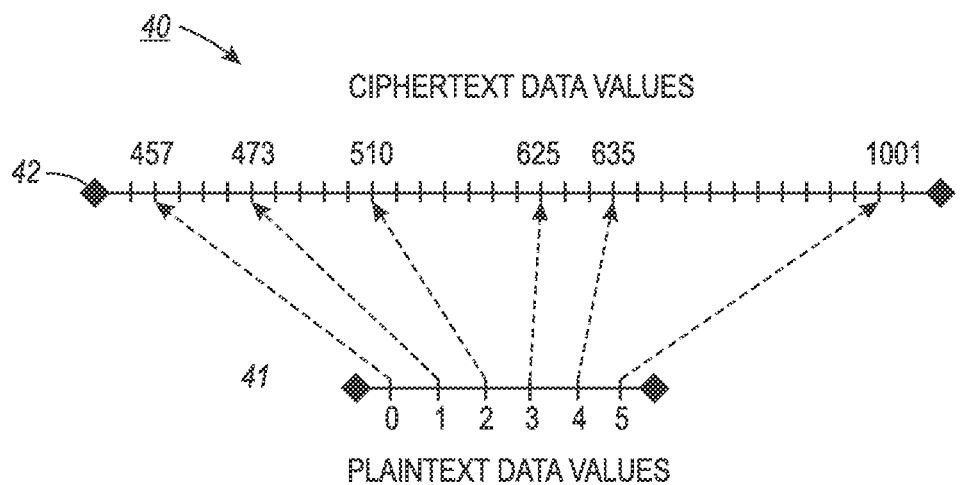
FIG. 3 is a block diagram showing, by way of example, a process for order preserving encryption.

In one embodiment, order preserving encryption can be used during which the data values are run through a pseudo random generator that assigns encrypted values to each data value while maintaining the order of the non-encrypted data values. Unlike most encryption algorithms, such as Advanced Encryption Standard, order preserving encryption maintains the ordering of plaintext data in their encrypted form. FIG. 3 is a block diagram showing, by way of example, a process for order preserving encryption. A plaintext version of the data values 41 include the numbers 0-5. The order of the plaintext data values 41 is maintained upon order preserving encryption to generate ordered ciphertext data values 42. Specifically, a pseudo-random generator performs pseudo-random mappings of the plaintext values to order-preserving encryption values as ciphertext values. The only criteria for order preserving encryption is that the orders of the plaintext values and ciphertext values cannot cross. In one example, the number 0 is mapped to 457, while 1 is mapped to 473, 2 is mapped to 510, 3 is mapped to 625, 4 is mapped to 635, and 5 is mapped to 1001. Zero is the smallest plaintext data value and the encrypted value of zero, 457, is the smallest ciphertext value of the dataset. Additionally, the plaintext value 5 is the largest, while the encrypted value for 5, 1001, is also the largest.

When the data values represent text, such as colors, medical conditions or other types of unquantifiable values, numerical values can be assigned to each of the data values prior to encryption. For example, numerical values can be assigned to medical conditions based on a severity of the condition or morbidity, and subsequently, encrypted. Preserving the order of the encrypted values helps to ensure that the data is still useful despite being encrypted. Other encryption algorithms are possible; however, at a minimum, the ordering of the encrypted data values must be preserved consistent with the plaintext values.

Returning to FIG. 2, the encrypted data set is then transmitted (block 33) to the untrusted anonymizer for processing (block 34) of the data. Specifically, the anonymizer can determine whether anonymization is needed based on sensitivity values, and if so, an amount of alteration needed to protect the data of a sensitive attribute. Specifically, an attribute is qualified as sensitive if the attribute may be used to identify users, and is known as a quasi-identifier. To determine the sensitivity of an attribute, the anonymizer analyzes an attribute and assigns a sensitivity value, as further described in U.S. Patent Application Publication No. 2017/0124336, pending, the disclosure of which is hereby incorporated by reference. In one embodiment, the attributes can be associated with a weight that can be used to help determine the sensitivity value. A type of data anonymization can be determined based on the sensitivity value of each attribute, including data generalization or data masking. In one example, each sensitivity value can range from 0 to 1, with zero representing non-sensitive data and 1 representing extremely sensitive data. When the level of sensitivity for an attribute is very high, masking of data values may be the only available option. However, when the sensitivity values are low or medium, an attribute may be designated as a quasi-identifier, which indicates that the attribute may not identify an associated individual on its own, but in concert with other information, such as one or more quasi-identifiers, the individual can be identified. For example, age generally does not identify a person; however, age, gender and address taken together could possibly identify an associated person. For quasi-identifiers, anonymization techniques, such as generalization, may be appropriate for protecting the data and preventing disclosure.

Figure 4:
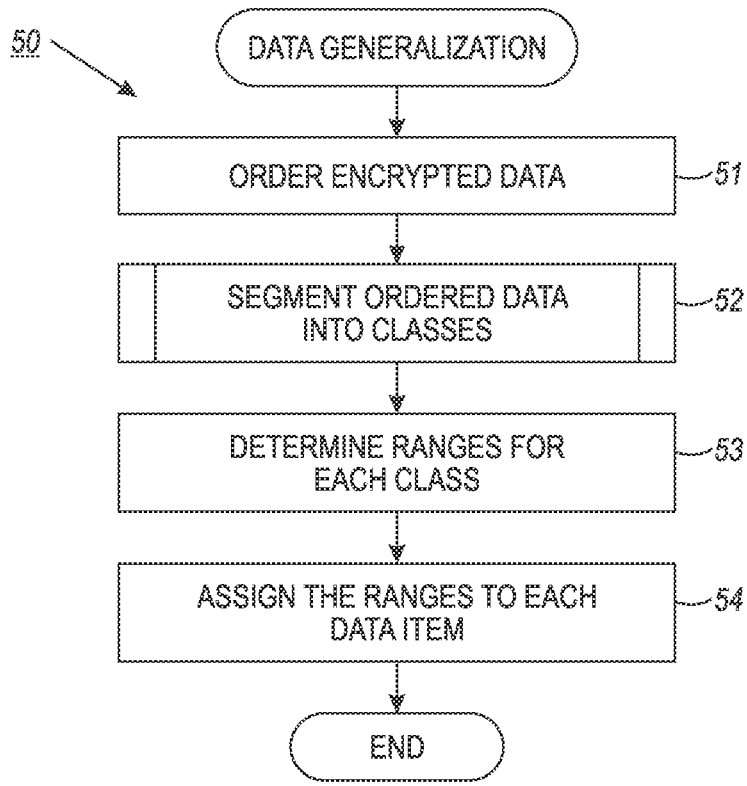
FIG. 4 is a flow diagram showing, by way of example, a process for anonymizing data by generalization.
Figure 12:
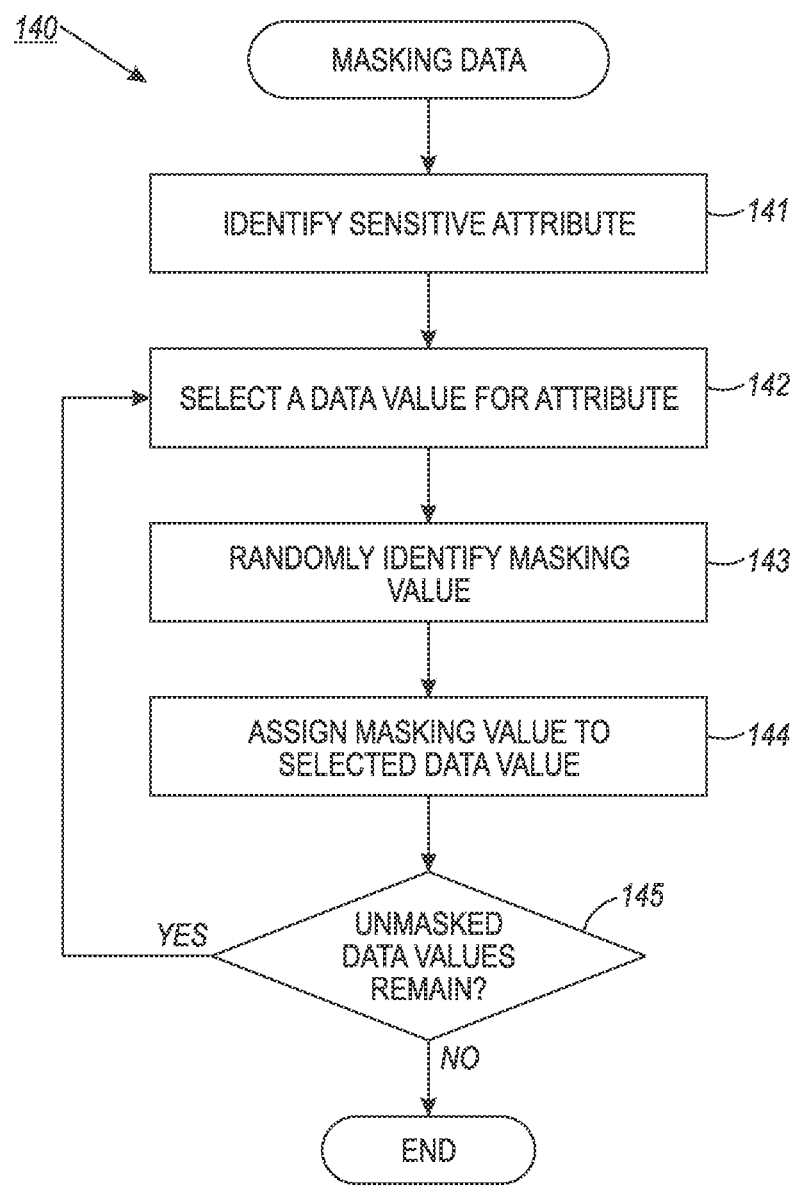
FIG. 12 is a flow diagram showing, by way of example, a process for anonymizing data values via masking.

During data processing, generalized or masked values are determined for each data value associated with a sensitive attribute, as further described below with reference to FIGS. 4 and 12. Subsequently, the anonymized data values can be transmitted (block 35) to the data owner for optionally providing to a third party. Once received, the data owner can replace the plaintext data values in the data set with the anonymized or masked values from the anonymizer. In a further embodiment, for generalized values, the data owner can decrypt the generalized range of encrypted data values and provide the generalize ranges assigned to each data value in plaintext, rather than ciphertext. For instance, the anonymizer transmits the generalized ranges of encrypted data values to the data owner. The data owner can then decrypt the anonymized ranges to obtain a range of plaintext values, which are provided to the requesting third party. In this embodiment, the range provides generalization of a data value, while the plaintext allows the third party more access to the data than when the generalized ranges are provided in ciphertext.

During generalization, data values are grouped and a range of the values for each group is assigned to the data values within that group as anonymized values. FIG. 4 is a flow diagram showing, by way of example, a process for anonymizing data by generalization. The anonymizer receives encrypted data values for one or more sensitive attributes and orders (block 51) the encrypted data values for a single attribute. The anonymizer then segments (block 52) the ordered data into two or more classes. The segmentation can occur randomly, using the median of the encrypted data values, or based on a predetermined n-value, as further described below with reference to FIG. 6. Alternatively, the data owner can provide ciphertext ranges to the anonymizer, and the anonymizer then places the encrypted data values into groups based on the range. Once the encrypted data values have been segmented or placed into classes, a range of the encrypted data values is determined (block 53) for each class and the determined ranges are assigned (block 54) to each encrypted data value that belongs to the class corresponding to that range, as anonymized values.

In one example, an advertising research company contacts a department store for data regarding customer expenditures, including customer age, zip code, and purchase amount. The department store identifies and accesses a data set in which the requested data is maintained. FIG. 5 is a block diagram showing, by way of example, a dataset 60 for anonymization. The data set 60 includes a chart with attributes 61-66 listed along an x-axis and data values populating the columns below each listed attribute. The attributes include first name 61, last name 62, age 63, account number 64, zip code 65, and purchase amount 66. The data owner can review the dataset to preliminarily determine whether any of the attributes may be or are sensitive. In this example, the data owner determines that the age attribute is determined to be somewhat sensitive and anonymization is likely to be necessary. The data values for the age attribute are each encrypted using order-preserving encryption. In a further example, the data owner encrypts the data values for all the attributes in the data set and requests the anonymizer to determine which attributes require anonymization of the associated data values.

Once encrypted, the department store can send the encrypted data to the anonymizer or alternatively, the department store can provide the anonymizer with a Virtual Private Network connection to directly access the encrypted data values. Upon receipt of the encrypted data values for the age attribute, the anonymizer anonymizes the encrypted data values by segmenting the ordered encrypted data values into classes and assigning a class label to each encrypted data value within that class.

Figure 6:
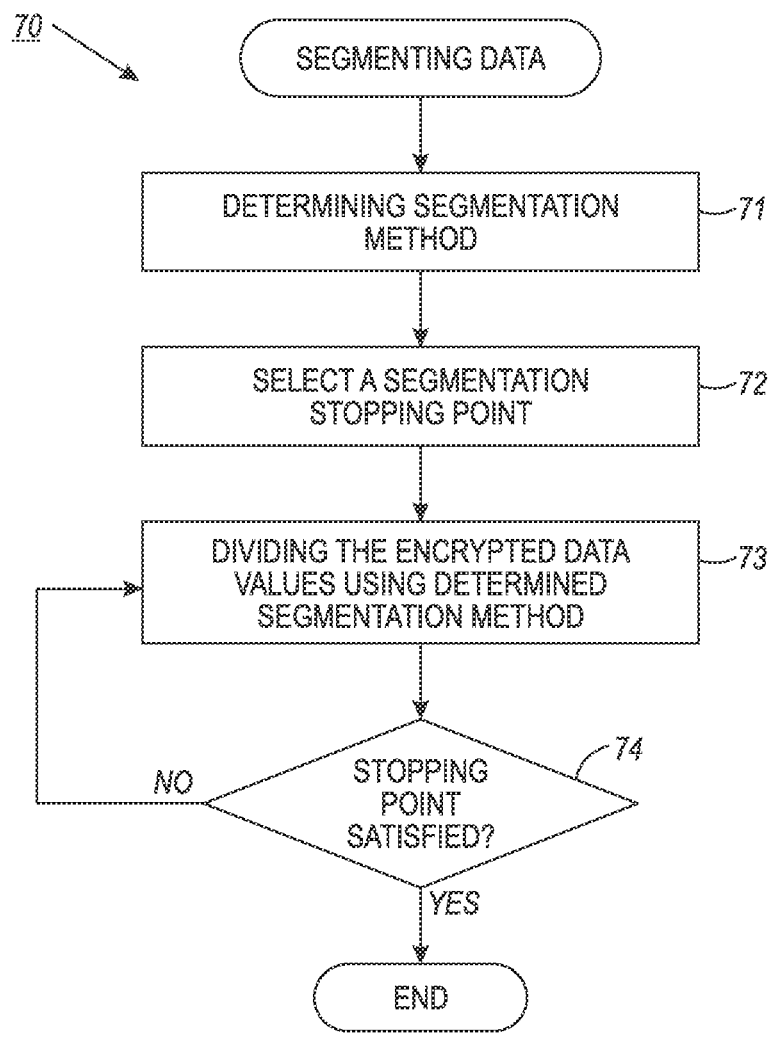
FIG. 6 is a flow diagram showing, by way of example, a process for segmenting encrypted data values.

Different methods for segmenting the encrypted data values are possible. FIG. 6 is a flow diagram showing, by way of example, a process 70 for segmenting encrypted data values. A segmentation method to be applied to the encrypted data values is determined (block 71) and a segmentation stopping point is selected (block 72). The encrypted data values are divided (block 73) into classes using the selected segmentation method until the selected stopping point is satisfied (block 74).

The different segmentation methods can include random segmentation, n-segmentation, and median segmentation. However, other methods for segmentation are possible. Random segmentation includes randomly segmenting the encrypted data values until the segmentation stopping point has been reached. The segmentations and classes can be uniform or non-uniform, which can be determined by the anonymizer or requested by the data owner. Alternatively, the encrypted data values can be segmented via one or more segmentation parameters, including a predetermined n-value and the stopping point. For the n-segmentation value, when n=2, the encrypted data values are divided in half at each segmentation, or division of the data values. Further, when n=3, the encrypted data values are divided into three groupings at each segmentation. The n segmentations occur until the stopping point has been satisfied. The data owner, an individual associated with the data owner, or the anonymizer can determine a value for n, as well as the selected stopping point. Finally, median segmentation includes splitting the encrypted data values into two classes based on a median encrypted data value (equivalent to n=2). The segmentation of the encrypted data values continues by dividing the data values at the median until the stopping point has been satisfied.

In one embodiment, the stopping point is when all classes have k elements, where k is the desired level of privacy. In another embodiment, the stopping point is a predetermined number of classes, which must be satisfied for the segmentation to terminate. In a further embodiment, segmentation terminates when a predetermined number of segmentations have been completed. The data owner or anonymizer can determine the predetermined stopping point. The anonymizer uses domain expertise to calculate the stopping point, such as based on previous data sets, attributes, and levels of obfuscation. The number of classes to be formed directly relates to a strength of the data anonymization. For instance, when a fewer number of classes are generated, the more anonymous the anonymization value is for each of the classes since the range and number of data values within each class is larger. In contrast, when more classes are generated, the anonymization values are less anonymous. Further, the segmenation stopping point can be dependent on a specificity of the data requested by the third party. When more specific data is required, the number of classes can be set higher than when less specific data is required.

Segmentation can be performed on a list of the ordered encrypted data values, or alternatively, via a tree of the ordered encrypted data values. Returning to the above example with reference to the data set of FIG. 5, the age attribute is selected for anonymization. FIG. 7 is a flow diagram showing, by way of example, a process for anonymizing data values for a single attribute. The age attribute 81 lists individual ages for customers of the department store as data values. Subsequently, the data values are individually encrypted using order-preserving encryption to generate encrypted data values 82. The encrypted data values 82 are then ordered 83, for example, from lowest to highest value or highest to lowest value. Next, the ordered encrypted data values are segmented 84a-84b.

In one embodiment, the ordered encrypted data values can form a list upon which the segmentation occurs. Segmentation parameters, also known as stopping points, are provided to conduct the segmentation, including, in one example, an n-segmentation value, which represents a number of resulting classes, and a k number of elements or data values per class into which the encrypted data values are to be divided. The n-segmentation value is set to n=3, and the number of data values is set to k=2. The k-value is a minimum number of data values, and any of the n segments or classes can include the minimum k number of data values or more.

With respect to the ordered list, a first segmentation splits the encrypted data values into two classes so that encrypted data values 0857, 1056, 2764, and 4798 are in one class and encrypted data values 6321, 7744, 8791 and 9921 are in another class. Since n=3, a further segmentation is required to create three classes. Thus, a further split is made within the class with the lowest ordered encrypted values, such that 0857-1056 forms a first class, 2764-4798 forms a second class, and 6321-9921 form a third class. In a further embodiment, the highest ordered encrypted values can be split, rather than the lowest ordered values. The order of the splitting can be predetermined, entered by a user, or determined automatically.

In yet a further embodiment, the n value can represent a number of segmentations or splits to be applied to the data values, rather than the number of final segments or classes, as described. For example, when n represents the number of splits as 3, a first split is made to form two classes with 0857, 1056, 2764, and 4798 are in one class and encrypted data values 6321, 7744, 8791 and 9921 are in another class. A second split can then be made of the lowest ordered values such that 0857 and 1056 are in one class and 2764 and 4798 are in another class. Finally, a third split can be made such that 6321 and 7744 are in one class and 8791 and 9921 are in another class. Thus, after the three splits have occurred, four classes are generated.

Figure 8:
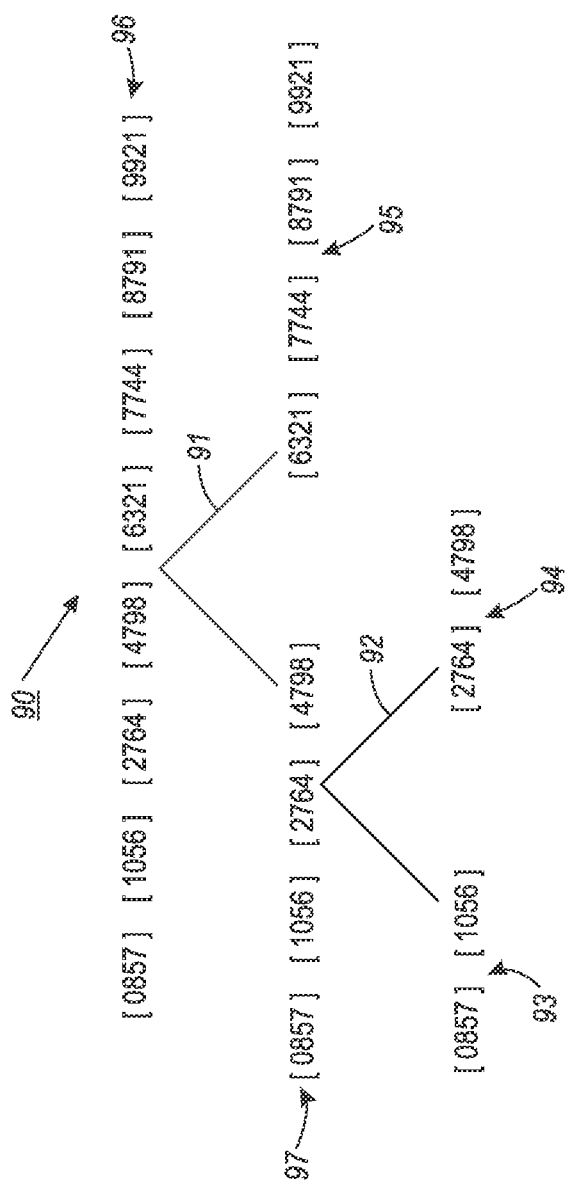
FIG. 8 is a block diagram showing, by way of example, a tree for encrypted data values of a single attribute.

In a further embodiment, a tree can be used to segment the encrypted data values for an attribute. FIG. 8 is a block diagram showing, by way of example, a tree 90 for encrypted data values of a single attribute. The ordered encrypted data values are represented by a node 96 at a top of the tree 90. A first division 91 occurs, which segments the ordered encrypted data into two groups, with encrypted data values 0857, 1056, 2764, and 4798 in one group 97 and encrypted data values 6321, 7744, 8791, and 9921 in another group 95. A further division 92 is required since the predetermined number is classes is 3. Thus, the group with the lower values is further divided into two groups, with 0857 and 1056 in one group 93 and 2764 and 4798 in a different group 94, to form a total of three classes 93-95 of the encrypted data values.

Returning to the discussion with respect to FIG. 7, ranges 85 for each class are determined after segmentation. The assigned ranges can be formed from the lowest and highest encrypted data values in each class or alternatively, the ranges can be expanded to cover additional data values, as long as the range does not overlap with the range of another class. For example, the range for Class I can be 0857 to 1056 based on the data values; however, the range can also be ≤1056 or ≤2700. Other ranges are possible. For Class II, the encrypted data values range from 2764 to 4798, and for Class III, the encrypted data values range from 6321 to 9921. However, the ranges can also be broader, such as 2705 to 6320 for Class II and 6321 and higher for Class III. Other ranges are possible. The method for range determination can be predetermined, determined automatically, or selected by a user.

Once determined, the range of each class is then assigned to each encrypted data value belonging to that class as the anonymized value. Therefore, age 62 has an encrypted data value of 8791 and belongs to Class III. The range of 6321-9921 is assigned to age 62 as an anonymized value. Additionally, age 27 has an encrypted value of 1056 and belongs to Class I, so the range 0857-1056 is assigned to the age 27 as an anonymized data value 86.

Once the data values for one or more attributes have been anonymized, the dataset can be provided to a third party for processing or analysis. Due to the order preserving encryption, the third party would be able to utilize the data for research, such as identifying young, old, and middle age populations of the dataset based on the ranges of the encrypted data values. For instance, the lower ordered ranges are associated with lower ages, while the higher ordered ranges are associated with higher ages.

In yet a further embodiment, the data values can be formed into classes using a bottom up method based on the tree, where a determination is made as to how many leaf nodes of the tree should be combined to ensure that the n number of classes and k number of data values for each class are satisfied.

Figure 9:
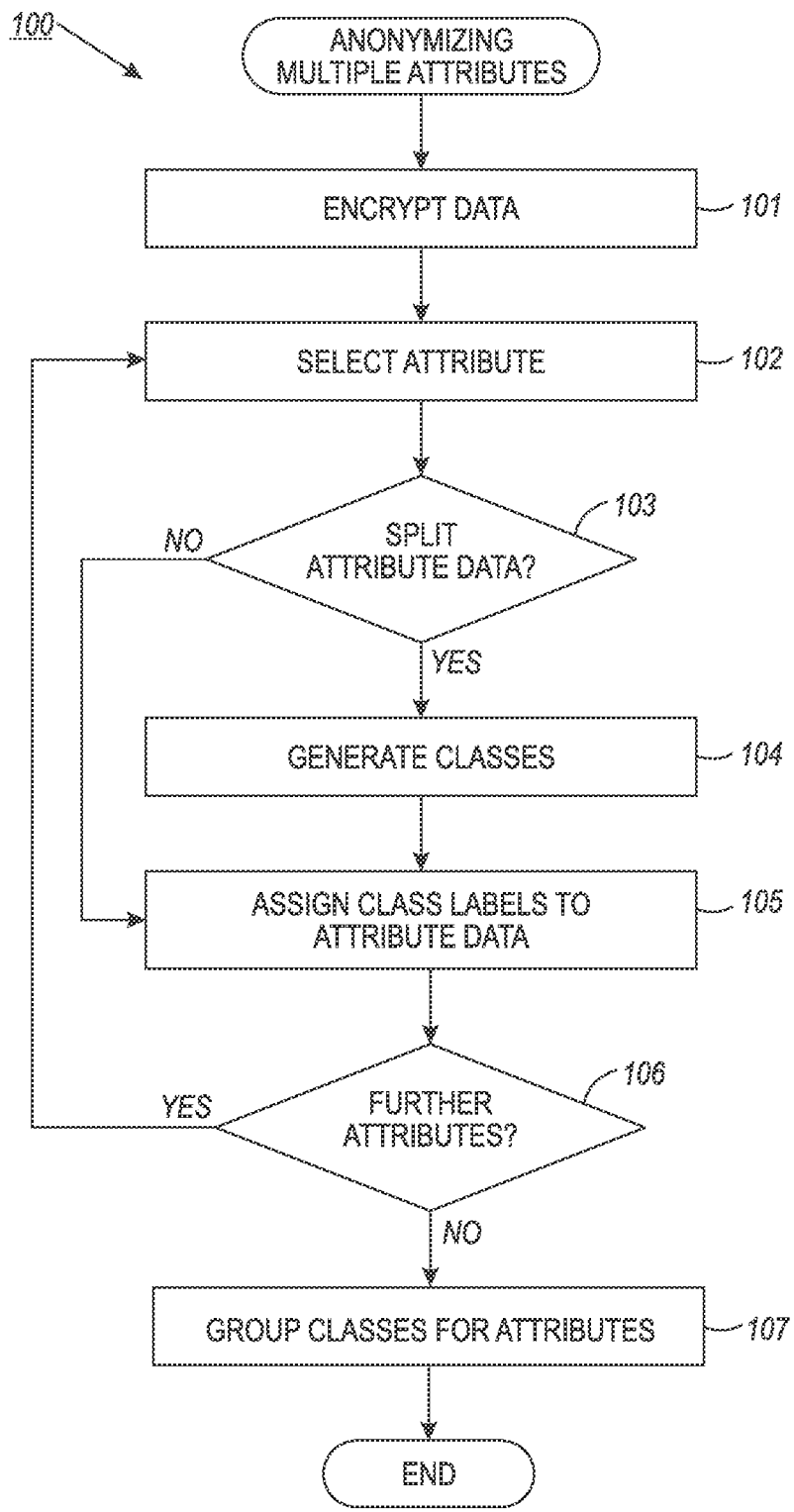
FIG. 9 is a flow diagram showing, by way of example, a process for jointly anonymizing data of two or more attributes via generalization.

In a further embodiment, the data values for two or more of the attributes can be anonymized together to ensure that a relationship between the data values of the attributes is maintained. FIG. 9 is a flow diagram showing, by way of example, a process 100 for jointly anonymizing data of two or more attributes. Two sensitive attributes are selected for anonymization. Attributes for anonymization can be selected based on a sensitivity value, data value content, or importance, as well as based on other factors. For example, the data values of the two attributes are individually encrypted (block 101) using order-preserving encryption. Next, one of the attributes is selected (block 102) for anonymization processing. There are several possible selection strategies. For instance, when based on a sensitivity value, the attribute with the highest sensitivity may be selected as the first attribute or vice versa. Another possibility is to select the attribute at random or based on the number of unique values the attributes takes. However, other strategies for selection are possible The data values of the selected attribute are then split (103) into classes until a stopping point condition is satisfied, such as satisfying a value of n final classes. Based on the splitting of the attribute data, classes are formed (block 104) from the encrypted data values for the first selected attribute and ranges for each class are determined. When the stopping point is satisfied and the data values can no longer be split, ranges are determined for each class and then assigned (block 105) to the encrypted data values that are included in that class, as anonymized data values. Next, a determination is made as to whether any further attributes remain (block 106) for processing, if so, the attribute selection (bock 102) and splitting (block 103), occur as well as assigning (block 104) labels to classes generated from the splitting. However, if not, the classes generated for the two or more attributes are grouped (block 107) into combined classes, and labels are generated for the anonymized values of the combined attribute values, as further described below with reference to FIG. 10. Once anonymization values have been determined, the determined anonymization values can then replace the plaintext data values for each data value of the combined attributes in the data set prior to providing the data to the requesting third party.

The grouping of the combined classes for two or more attributes can occur randomly, or on a predetermined basis, or as instructed by a user. FIG. 10 is a block drawing showing a chart 120 of classes for two different attributes. The classes for one attribute 121, such as Attribute 1, are listed along the top row of the chart, while the classes of the other attribute 122, such as Attribute 2, are listed along a column of the chart 120. The grouping of the classes for the different attributes is based on a predetermined n-segmentation value. In this example, n=3 and thus, the classes of the two attributes must be combined into three groups. The segmentation can be performed randomly, as a predetermined method, or as instructed by a user. In this example, a total of three groups are formed, as indicated in FIG. 10. This is equivalent to painting the cells of the table with n colors, where n is the number of groups or segments desired. Subsequently, based on the final groups, anonymization values are assigned to each group. Similar to the previously explained embodiment, a user can generate the values for anonymization by applying order-preserving encryption to the group indices or to a mathematical function of the group indices.

Joint anonymization is beneficial when a third party wants to identify individuals that satisfy multiple attributes. For instance, a researcher obtains data from a hospital to determine a number of Alzheimer patients between the ages of 62-80 years old that live in California. In this example, data values for medical condition can remain as plaintext, while age and zip codes values are anonymized. In one embodiment, age is first anonymized and then the zip codes associated with each age value are anonymized to identify Alzheimer patients between the ages of 62 and 81 that live in each identified zip code. The total number of Alzheimer patients between the ages of 62 and 81 that live in California are then identified by totaling the number of patients for each zip code in California. In a further embodiment, the data values for age are first anonymized and then the states associated with each zip code are anonymized to identify Alzheimer patients between the ages of 62 and 81 that live in California, versus those Alzheimer patients between the ages of 62 and 81 that do not live in California.

Further, returning to the above department store example, the third party data requestor wants to determine average customer expenditures or discover the age group of customers that spend the most money, that visit the department store most often, and that have credits cards issued by the department store. In this example, the third party would be able to identify whether individuals of an older age or younger age spent more money using a combination of the anonymized age data and the plaintext purchase amounts, as shown in FIG. 5. Further yet, the third party also wants to determine the regions in which the individuals who spend the most money live. To provide the third party with the requested data, the relationship of the data values must be maintained during anonymization. The relationships can be maintained by assigning anonymization values to groups of encrypted data values for a first attribute and separate a second attribute and then grouping the classes of the first and second attribute, as described above.

Once determined and assigned, the anonymization values are then used to replace the plaintext data values of the sensitive attributes in the data set. FIG. 11 is a block diagram showing, by way of example, the data set of FIG. 5 with anonymized values. As in FIG. 5, the data set includes attributes 61 for first name, last name, age, account number, zip code, and purchase amount. Each attribute is associated with plain text data values 62 for individuals represented by the data set. The plain text data values for the age and zip code attributes have been replaced with anonymized data values 63 to prevent an untrusted third party from identifying a specific individual represented by data values within the data set. For example, the anonymized data values were determined for the age attribute, as described above with reference to FIGS. 7 and 8.

Within this data set, an untrusted third party can likely still identify the individuals since first and last names are provided for each individual. To protect the individuals' identities, the data values for first and last name can be masked. Masking may be required for particular attributes when the data is sensitive or when mandated by state or federal rules. Another option is to simply suppress those attributes. FIG. 12 is a flow diagram showing, by way of example, a process 140 for masking data values. At least one attribute within the data set is determined (block 141) to be sensitive or required to be masked under state or federal regulations. In one example, a data owner instructs the anonymizer to anonymize a data set, which includes data that falls under the Health Insurance Portability and Acountability Act (HIPAA). Under HIPAA, data values for certain attributes are required to be completely obfuscated. The anonymizer is programmed with the regulations of HIPAA and identifies those attributes for masking based on HIPAA requirements.

A data value for the sensitive attribute is selected (block 142) and randomly masked (block 143) by assigning a masking value to the selected data value. The masking can include substitution of a data value with another value that resembles the data value being substituted, substitution of a data value using a pseudo-random function, such as a cryptographic Hash, or encryption. Other types of masking are possible. If unmasked data values remain (block 145) for the attribute, another data value is selected (block 142) for masking.

The masked data values replace the plain text data value for the sensitive attribute as anonymized data within the data set. FIG. 13 is a block diagram showing by way of example, the data set 150 of FIG. 11 with masked data values for two of the attributes. In this data set 150, the attributes 151 for first name and last name were identified as sensitive and the data values were processed according to their privacy sensitivity. Specifically, the data values for the first and last name attributes were masked by hashing. Additionally, the data values for the age and zip code attributes, which are considered quasi-identifiers, were anonymized by generalization. The plaintext data values remaining in the data set can remain in plaintext or can be encrypted prior to providing the dataset to a third party.

As with generalization, the data owner can encrypt sensitive attributes and ask the anonymizer to mask them. The anonymizer in this case operates on encrypted data.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for anonymizing encrypted data, comprising:
an identification module to identify at least one attribute within a dataset for anonymization, wherein each attribute is associated with a plurality of data values;
an encryption module to encrypt each data value for each identified attribute while maintaining an order of the encrypted data value;
an order module to order the encrypted values;
a segmentation module to segment the ordered encrypted data values into two or more classes based on the ordering of the encrypted data values;
a determination module to determine a range of the encrypted data values within each of the segmented classes; and
an assignment module to assign the range of one of the classes to each encrypted data value within that class as anonymized data,
wherein the modules are executed via a processor.

2. A system according to claim 1, further comprising:
a delivery module to provide the anonymized data values to an untrusted third party.

3. A system according to claim 1, further comprising:
a masking module to identify a further attribute within the data set for anonymization and to randomly assign a masked value to each of the data items associated with the further attribute.

4. A system according to claim 1, further comprising:
a joint segmentation module to identify a further attribute within the data set for anonymization with the at least one attribute, wherein each data value for the at least one attribute corresponds with a further data value for the further attribute, to encrypt the further data values, to segment the further encrypted data values for each of the segmented classes into further segmented classes, and to generate groups of classes for the at least one attribute and the further attribute.

5. A system according to claim 1, further comprising:
a class identifier to identify an n number of segmented classes.

6. A system according to claim 5, wherein the segmentation module randomly segments the ordered encrypted data values into the identified n-number of segmented classes.

7. A system according to claim 5, wherein the segmentation module selects a minimum k number of encrypted data values per class and segments the ordered encrypted data values until the identified n number of segmented classes is reached and each of the segmented classes includes at least a k number of encrypted data values.

8. A system according to claim 1, wherein the segmentation module designates a number of iterations for the segmentation and segments the ordered encrypted data values until the designated number of iterations has been performed.

9. A system according to claim 1, wherein the segmentation module conducts the segmentation of the ordered encrypted data values via a tree.

10. A system according to claim 1, further comprising:
a data compilation module to provide to the third party at least one of the data set with the anonymized values and the data values of the other attributes, and the data set with the anonymized values and encrypted values for the other attributes.

11. A computer-implemented method for anonymizing encrypted data, comprising:
identifying by a trusted server at least one attribute within a dataset for anonymization, wherein each attribute is associated with a plurality of data values and the trusted server comprises a central processing unit, memory, an input port, and an output port;
encrypting by the trusted server each data value for each identified attribute while maintaining an order of the encrypted data value;
ordering via an anonymizer the encrypted values;
segmenting by the anonymizer the ordered encrypted data values into two or more classes based on the ordering of the encrypted data values;
identifying by the anonymizer a range of the encrypted data values within each of the segmented classes; and
assigning by the anonymizer the range of one of the classes to each encrypted data value within that class as anonymized data.

12. A method according to claim 11, further comprising:
providing the anonymized data values to an untrusted third party.

13. A method according to claim 11, further comprising:
identifying a further attribute within the data set for anonymization; and
randomly assigning a masked value to each of the data items associated with the further attribute.

14. A method according to claim 11, further comprising:
identifying a further attribute within the data set for anonymization with the at least one attribute, wherein each data value for the at least one attribute corresponds with a further data value for the further attribute;
encrypting the further data values;
segmenting the further encrypted data values for each of the segmented classes into further segmented classes; and
generating groups of classes for the at least one attribute and the further attribute.

15. A method according to claim 11, further comprising:
identifying an n number of segmented classes.

16. A method according to claim 15, further comprising:
randomly segmenting the ordered encrypted data values into the identified n-number of segmented classes.

17. A method according to claim 15, further comprising:
selecting a minimum k number of encrypted data values per class; and
segmenting the ordered encrypted data values until the identified n number of segmented classes is reached and each of the segmented classes includes at least a k number of encrypted data values.

18. A method according to claim 11, further comprising:
designating a number of iterations for the segmentation; and
segmenting the ordered encrypted data values until the designated number of iterations has been performed.

19. A method according to claim 11, further comprising:
conducting the segmentation of the ordered encrypted data values via a tree.

20. A method according to claim 11, further comprising:
performing at least one of:
encrypting the data values of the other attributes in the data set and providing the data set to the third party with the anonymized values and the encrypted values; and
providing the data set to the third party with the anonymized values and the data values of the other attributes.

* * * * *